US012489865B2

(12) United States Patent
Jeong et al.

(10) Patent No.: US 12,489,865 B2
(45) Date of Patent: Dec. 2, 2025

(54) ELECTRONIC DEVICES AND METHODS FOR PROVIDING VIDEO CALLS

(71) Applicant: SAMSUNG ELECTRONICS CO., LTD., Suwon-si (KR)

(72) Inventors: Eunsu Jeong, Suwon-si (KR); Yusic Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 236 days.

(21) Appl. No.: 18/220,390

(22) Filed: Jul. 11, 2023

(65) Prior Publication Data

US 2023/0353607 A1 Nov. 2, 2023

Related U.S. Application Data

(63) Continuation of application No. PCT/KR2022/012505, filed on Aug. 22, 2022.

(30) Foreign Application Priority Data

Sep. 29, 2021 (KR) ........................ 10-2021-0129054

(51) Int. Cl.
*H04N 7/14* (2006.01)
*H04L 65/403* (2022.01)
(Continued)

(52) U.S. Cl.
CPC ............. *H04N 7/14* (2013.01); *H04L 65/403* (2013.01); *H04N 7/15* (2013.01); *H04N 21/431* (2013.01); *G06T 2200/24* (2013.01); *H04N 7/141* (2013.01)

(58) Field of Classification Search
None
See application file for complete search history.

(56) References Cited

U.S. PATENT DOCUMENTS 8,731,612 B2   5/2014 Mun
9,614,969 B2*  4/2017 Aue ...................... H04M 3/568
(Continued)

FOREIGN PATENT DOCUMENTS

JP   2020154460 A   9/2020
KR   100734399 B1   7/2007
(Continued)

OTHER PUBLICATIONS

International Search Report and Written Opinion for International Application No. PCT/KR2022/012505; International Filing Date Aug. 22, 2022; Date of Mailing Dec. 6, 2022; 10 Pages.

*Primary Examiner* — Quoc D Tran
(74) *Attorney, Agent, or Firm* — CANTOR COLBURN LLP

(57) ABSTRACT

According to various embodiments of the disclosure, an electronic device may include a display, a memory, a communication module configured to perform a video call with an external electronic device, and a processor electrically connected with the display, the memory, and the communication module, and the processor may receive at least one piece of image data from the external electronic device through the communication module, may output the received at least one piece of image data to a first area of the display, may extract first image data among the at least one piece of image data in response to a first user input, may identify a first object included in the extracted first image data, and may output a first user interface related to the identified first object, and the first image data to a second area of the display which is distinguished from the first area.

18 Claims, 11 Drawing Sheets

(51) Int. Cl.
    *H04N 7/15*         (2006.01)
    *H04N 21/431*    (2011.01)

(56) References Cited

U.S. PATENT DOCUMENTS

| | | | |
|---|---|---|---|
| 2010/0283829 A1* | 11/2010 | De Beer | H04M 3/56 |
| | | | 348/14.09 |
| 2015/0103134 A1* | 4/2015 | Cheng | H04N 7/147 |
| | | | 348/14.07 |
| 2020/0026764 A1* | 1/2020 | Ahn | G10L 15/30 |
| 2021/0150726 A1 | 5/2021 | Kao et al. | |
| 2021/0223945 A1* | 7/2021 | Kim | G06F 3/0488 |
| 2022/0247918 A1* | 8/2022 | O'Leary | H04N 5/2624 |
| 2023/0388440 A1* | 11/2023 | Chen | H04N 7/15 |

FOREIGN PATENT DOCUMENTS

| | | |
|---|---|---|
| KR | 101189053 B1 | 10/2012 |
| KR | 20140081642 A | 7/2014 |
| KR | 20160086560 A | 7/2016 |
| KR | 20190106046 A | 9/2019 |
| KR | 20190120122 A | 10/2019 |
| KR | 102178176 B1 | 11/2020 |
| KR | 20210051065 A | 5/2021 |
| KR | 20210094860 A | 7/2021 |

\* cited by examiner

ELECTRONIC DEVICES AND METHODS FOR PROVIDING VIDEO CALLS

CROSS-REFERENCE TO RELATED APPLICATION(S)

This application is a continuation application, claiming priority under § 365(c), of an International application No. PCT/KR2022/012505, filed on Aug. 22, 2022, which is based on and claims the benefit of a Korean patent application number 10-2021-0129054, filed on Sep. 29, 2021, in the Korean Intellectual Property Office, the disclosure of which is incorporated by reference herein in its entirety.

TECHNICAL FIELD

Embodiments disclosed in the disclosure relate to an electronic device for performing video calls and methods thereof.

BACKGROUND ART

With the enhancement of communication technology, electronic devices may provide integrated user services by newly adding various functions such as a voice call service, a video call service, or the like. In particular, the video call service is a service that provides a video and a voice connection between users simultaneously. When an electronic device of a sender transmits voice and video signals to an electronic device of a receiver, the voice signal transmitted by the sender may be outputted through a speaker of the electronic device of the receiver, and the video signal may be outputted through a display of the electronic device. Through this, the receiver may make a video call with the sender by hearing and seeing contents of the call through the electronic device.

Typically, an electronic device of a transmitter may acquire image data by using a front-facing or rear-facing camera included in the electronic device, and may transmit the acquired image data to an electronic device of a receiver without processing, or the electronic device of the transmitter may process the acquired image data and may transmit the image data to the electronic device of the receiver.

DISCLOSURE

Technical Problem

In a process of making a video call, an electronic device of a receiver may receive image data transmitted by an electronic device of a transmitter, and may only output the image data through a display of the electronic device, and is not provided with a means for controlling the received image data and sharing with the electronic device of the transmitter. That is, image data outputted through the electronic device of the receiver in the process of a video call may be determined only under control of the electronic device of the transmitter, and therefore, a user of the electronic device of the receiver may have a limited user experience.

Accordingly, because image data outputted through an electronic device of a receiver is only controlled by an electronic device of the other side in a video call process, there may be a problem that it is difficult to make a video call according to a receiver's intention in a process of making a video call with a person at the other side.

Technical Solution

According to various embodiments of the disclosure, an electronic device may include a display, a memory, a communication module configured to perform a video call with an external electronic device, and a processor electrically connected with the display, the memory, and the communication module, and the processor may receive at least one piece of image data from the external electronic device through the communication module, may output the received at least one piece of image data to a first area of the display, may extract first image data among the at least one piece of image data in response to a first user input, may identify a first object included in the extracted first image data, and may output a first user interface related to the identified first object, and the first image data to a second area of the display which is distinguished from the first area.

According to various embodiments of the disclosure, an operating method of an electronic device may include: receiving at least one piece of image data from an external electronic device through a communication module; outputting the received at least one piece of image data to a first area of a display; extracting first image data among the at least one piece of image data in response to a first user input; identifying a first object included in the extracted first image data; and outputting a first user interface related to the identified first object, and the first image data to a second area of the display which is distinguished from the first area.

Advantageous Effects

According to various embodiments of the disclosure, a user may control an electronic device of a transmitter by utilizing image data received through an electronic device, or may process received image data according to a user's intention, and may share the image data with the electronic device of the transmitter. Therefore, the user may have an enhanced user experience in a process of making a video call.

In addition, various effects that are directly or indirectly grasped through the disclosure may be provided.

DESCRIPTION OF DRAWINGS

The above and other advantages and features of this disclosure will become more apparent by describing in further detail embodiments thereof with reference to the accompanying drawings, in which.

MODE FOR INVENTION

Figure 1:
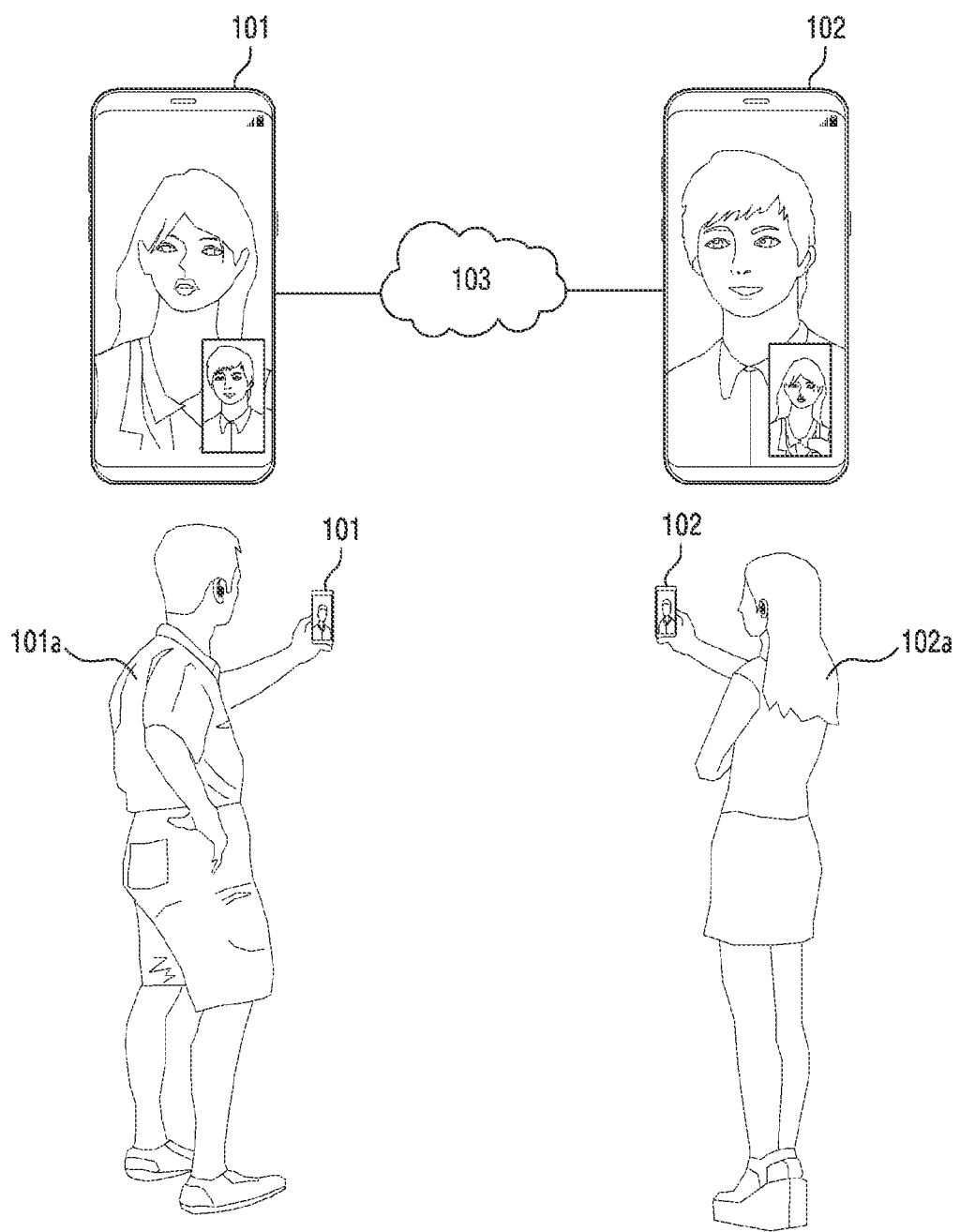
FIG. 1 is a view illustrating a state in which a video call is performed by using electronic devices according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "first component," "first region," "first layer," or "first section" discussed below could be termed a second element, component, region, layer, or section without departing from the teachings herein.

The terminology used herein is for the purpose of describing particular embodiments only and is not intended to be limiting. As used herein, "a," "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein are inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, various embodiments of the disclosure will be described with reference to the accompanying drawings. However, it should be appreciated that various embodiments are not intended to limit the disclosure to particular embodiments and include various modifications, equivalents, or alternatives of embodiments of the disclosure.

FIG. 1 illustrates a state in which a video call is performed by using electronic devices 101, 102 according to an embodiment.

Referring to FIG. 1, an electronic device 101 and an external electronic device 102 may perform a video call with each other through a network 103, such as a wireless cellular network, internet protocol (IP) network, or the like, as will be appreciated by those of skill in the art. The electronic device 101 and the external electronic device 102 may include communication modules to access the network 103 (for example, Internet or an internet protocol (IP) network). The electronic device 101 and the external electronic device 102 may exchange information with each other through the network 103 by using the communication modules of the respective electronic devices 101, 102. The network 103 may transmit packet data corresponding to voice data and image data from a source to a target. For example, the network 103 may transmit packets corresponding to voice data and image data when a video call is made between the electronic device 101 and the external electronic device 102.

According to an embodiment of the disclosure, in performing a video call, the electronic device 101 and the external electronic device 102 may be applied as an electronic device of a transmitter and an electronic device of a receiver. That is, when the video call is initiated, the electronic device 101 according to the disclosure may receive, from the external electronic device 102, image data resulting from photographing through a camera of the external electronic device 102. On the other hand, the electronic device 101 may transmit, to the external electronic device 102, image data resulting from photographing through a camera of the electronic device 101.

For convenience of explanation, a method for performing a video call according to the disclosure will be described with reference to an electronic device of a receiver, but the method for performing the video call and the electronic device according to the disclosure are not limited thereto, and an electronic device that may implement all configurations according to an embodiment of the disclosure may be applied.

For convenience of explanation, the electronic device of the receiver in the disclosure will be referred to as the electronic device 101, and the electronic device of the transmitter will be referred to as the external electronic device 102. As illustrated in FIG. 1, the electronic device 101 is used by a first user 101a and the external electronic device 102 is used by a second user 102a, and the video call is placed between the two users 101a, 102a.

In an embodiment, the electronic device 101 may implement a video call screen user interface (UI) in various forms based on received image data. When a video call is initiated, the electronic device 101 may be set to output the video call screen UI in a landscape mode of a display, but this should not be considered as limiting. In an example, the electronic device 101 may be set to output the video call screen UI in a portrait mode of the display when a video call is initiated. It will be appreciated that the output of the video call screen UI may be based, at least in part, on a physical orientation of the electronic device 101 and/or a user's preference selection within an application or software associated with making video calls.

In an embodiment, the electronic device 101 and the external electronic device 102 may communicate with each other through various wired and wireless communication techniques and networks such as Wi-Fi, long term evolution (LTE), infrared data association (IRDA), a local area network (LAN), a wireless LAN (WLAN), a high rate wireless personal area network (HR WPAN), a low rate wireless personal area network (LR WPAN), ultra-wideband (UWB), Internet, a telephony network, a mobile or cellular communication network, or the like.

Figure 2:
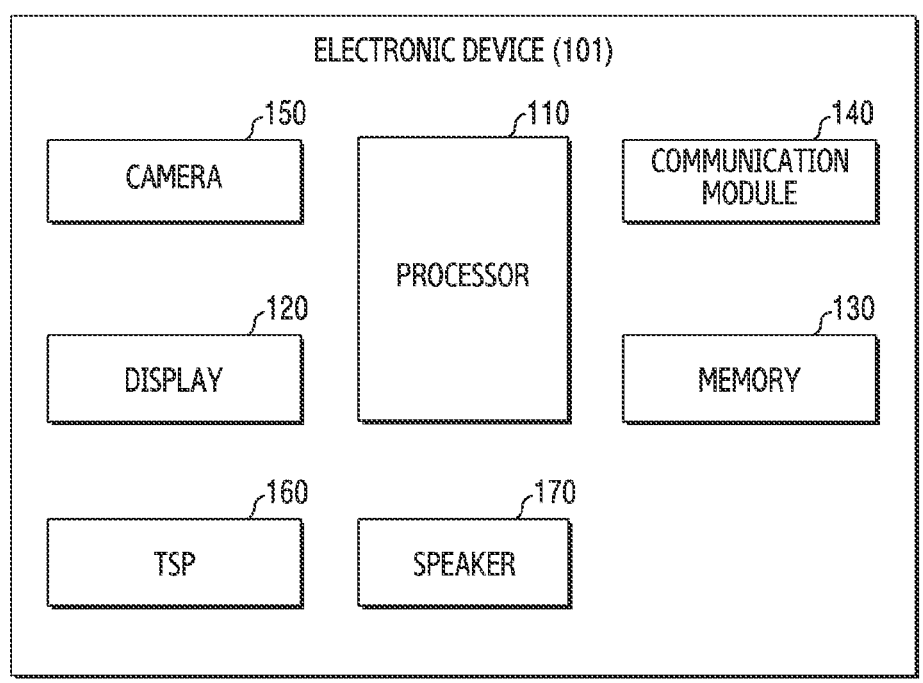
FIG. 2 is a view illustrating a hardware configuration of an electronic device according to an embodiment.

FIG. 2 illustrates a hardware configuration of an electronic device 101 according to an embodiment.

Referring to FIG. 2, the electronic device 101 may include a processor 110, a display 120, a memory 130, and/or a communication module 140. The electronic device 101 may be implemented to omit some components or may be implemented to further include a component which is not illustrated. For example, the electronic device 101 may further include a camera 150. Although illustrated as separate elements or components, the electronic components of the electronic device 101 may be implemented in one or more circuits, processors, printed circuit boards, and the like, as will be appreciated by those of skill in the art.

In an embodiment, the display 120 may visually output information to a user, based on at least one of an organic light emitting diode (OLED), a quantum dot light emitting diode (QLED), a liquid crystal display (LCD), and a light emitting diode (LED), or other type of display screen technology, as will be appreciated by those of skill in the art.

In an embodiment, the electronic device 101 may include a touch sensor panel (TSP) 160 of an add-on type which is disposed over the display 120 to control a user interface outputted through the display 120 more intuitively. The electronic device 101 is not limited to such configurations, and the touch sensor panel 160 may be implemented by an on-cell type or an in-cell type, such that the touch sensor panel is inserted into the display 120.

In an embodiment, the touch sensor panel 160 may detect a position of an object (for example, a part of user's body, such as a fingertip, or a stylus pen) which touches the display 120 or hovers over the display 120, by using at least one of a resistive film, capacitive components, a surface acoustic wave, infrared rays, or other proximity, contact, or detection mechanism, as will be appreciated by those of skill in the art. In an example, the touch sensor panel 160 of the display 120 may generate an analogue signal (for example, a touch event) in response to a user input on the touch sensor panel 160, and may convert the analogue signal into a digital signal and may transmit the digital signal to the processor 110.

In an embodiment, the processor 120 may determine a user's gesture, based on touch input data on the touch sensor panel 160 of the display 120. In an example, the user gesture may include at least one of touch, multi-touch, tap, double tap, long tap, tap and touch, drag, flick, long press, pinch in, and pinch out.

In an embodiment, the electronic device 101 may provide a photographing function by using the camera 150. In an example, the electronic device 101 may shoot a still image and a moving image (i.e., video).

In an embodiment, the camera 150 may include at least one of an image sensor, a red, green, blue (RGB) camera, an infrared camera, and a depth camera (for example, a time to flight (ToF) camera a structured light (SL) camera).

In an embodiment, the communication module 140 may support communication between the electronic device 101 and an external electronic device (for example, the external electronic device 102 of FIG. 1) and/or a network, as described above. For example, the communication module 140 may establish wireless communication according to a communication protocol which is prescribed with the external electronic device 102, and may transmit and receive signals or data by using a frequency band supporting the wireless communication. For example, the wireless communication may include, for example, at least one of ultra-wideband (UWB) communication, Wi-Fi communication, WiGig communication, Bluetooth (BT) communication, or Bluetooth low energy (BLE) communication.

In an embodiment, the memory 130 may store an operating system (OS) of the electronic device 101 and various applications and other data associated with the electronic device and/or based on user storage preferences. In an example, the memory 130 may store various data to be used for at least one component of the electronic device 101. In an example, the memory 130 may store data or instructions which are used by a processor or an application executed by the processor 110.

In an embodiment, the memory 130 may store image data which is acquired through the camera 150. In an example, the image data may include data resulting from photographing as a still image and/or a moving image (i.e., video).

In an embodiment, the processor 110 may control at least one other component of the electronic device 101, and may perform various data processing or computation. In an example, the processor 120 may execute an instruction for controlling operations of the display 120, the memory 130, the communication module 140, and/or the camera 150.

In an embodiment, the processor 110 may receive voice data and image data received from the external electronic device 102, and may decode the data. The processor 110 may output a decoded voice to a speaker 170. The processor 110 may output a decoded image to the display 120. The processor 120 may synthesize the voice data and the image data to match each other, and may output the data.

In an embodiment, the memory 130 may store voice data and image data received from the external electronic device 102.

In an embodiment, the processor 110 may control overall operations of the electronic device 101 for performing a video call, and a signal flow in the electronic device 101. When a video call is established, the processor 110 may configure a video call screen user interface (UI) of a landscape mode based on the image data received from the external electronic device 102. In an example, the video call screen UI may include a first area for outputting image data received from the external electronic device 102, and a second area for outputting at least one piece of image data extracted from the image data received from the external electronic device 102.

In an embodiment, when the video call screen UI is outputted, the processor 110 may support screen display by the landscape mode, screen display by the portrait mode according to a rotation direction (or a laying direction, an output mode) of the electronic device 101, and screen change display according to a change between the landscape mode and the portrait mode.

In an embodiment, when a video call is established, the processor 110 may acquire image data by using the camera 150. In an example, the processor 110 may transmit the image data acquired through the camera 150 to the external electronic device 102 through the communication module 140.

Figure 3:
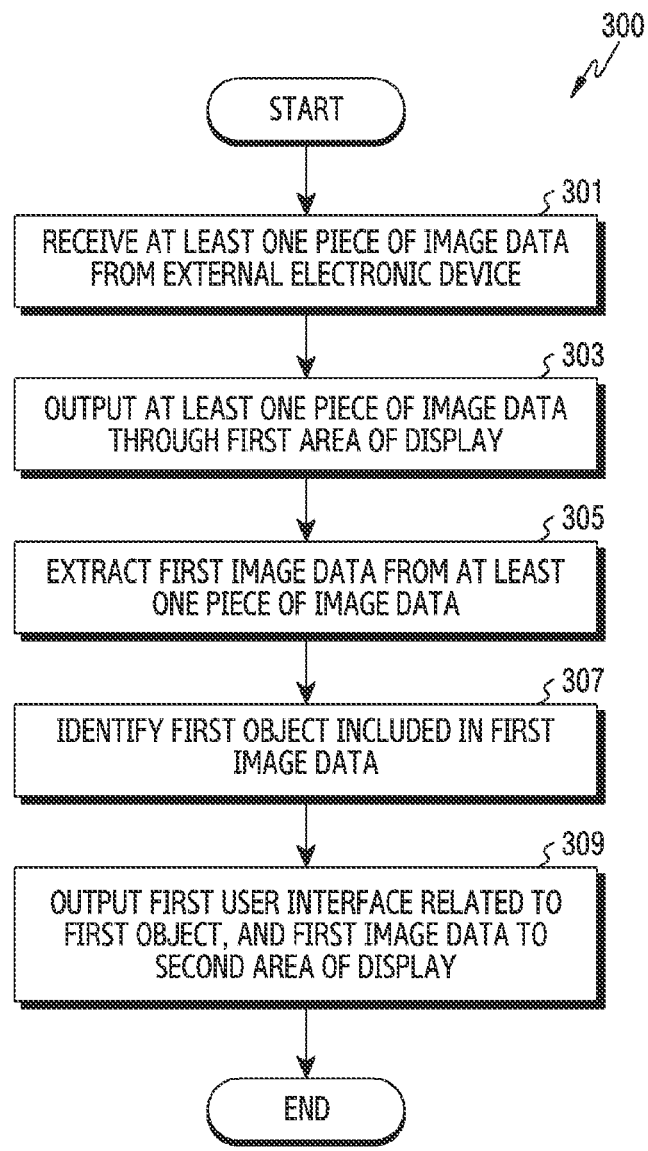
FIG. 3 is a sequence diagram provided to explain an operation of an electronic device which provides a video call function according to an embodiment.

FIG. 3 is a sequence diagram 300 provided to explain an operation of an electronic device 101 which provides a video call function according to an embodiment.

In an embodiment, the electronic device 101 may receive a video call connection. In an example, the electronic device 101 may request a video call connection from an external electronic device 102 by using the communication module 140, or may receive a request for a video call connection from the external electronic device 102.

According to an embodiment, in action 301, the electronic device 101 (for example, the processor 110 of FIG. 2) may receive at least one piece of image data from the external electronic device 102.

In an embodiment, when a video call connection with the external electronic device 102 is established, the processor 110 may receive at least one piece of image data from the external electronic device 102 through the communication module 140.

In an embodiment, the at least one piece of image data received from the external electronic device 102 may include image data which results from photographing by a camera included in the external electronic device 102. In another embodiment, the at least one piece of image data received from the external electronic device 102 may include data regarding an image that is outputted to a display of the external electronic device 102 (e.g., a shared-screen operation or connection between the two electronic devices 101, 102).

In an embodiment, when the video call connection with the external electronic device 102 is established, the processor 110 may operate the camera 150. In an example, the camera 150 may include at least one of a front-facing camera and a rear-facing camera provided in the electronic device 101. In an example, when the video call connection with the external electronic device 102 is established, the processor 110 may operate only one of the front-facing camera and the rear-facing camera.

In an embodiment, when the video call connection with the external electronic device 102 is established, the processor 110 may transmit at least one piece of image data to the external electronic device 102 through the communication module 140.

In an embodiment, the at least one piece of image data transmitted to the external electronic device 102 may include image data which results from photographing through the camera 150 of the electronic device 101. In an example, the image data resulting from photographing through the camera 150 of the electronic device 101 may include at least one of image data which is acquired through the front-facing camera of the electronic device 101 and image data which is acquired through the rear-facing camera of the electronic device 101.

According to an embodiment, in action 303, the electronic device 101 (for example, the processor 110 of FIG. 2) may output the received at least one piece of image data to a first area (for example, a first area 121 of FIG. 4) of the display 120.

In an embodiment, the processor 110 may output the at least one piece of image data received from the external electronic device 102 to the first area 121 of the display 120 in real time.

In an embodiment, the first area 121 of the display 120 may correspond to a certain area included in a video call screen UI outputted to the display 120.

According to an embodiment, the video call screen UI outputted to the display 120 will be described in detail with reference to FIGS. 4 to 5 and FIGS. 7 to 9.

According to an embodiment, in action 305, the electronic device 101 (for example, the processor 110 of FIG. 2) may extract first image data (for example, first image data 210 of FIG. 4) from the at least one piece of image data.

In an embodiment, the processor 110 may extract the first image data 210 from the at least one piece of image data received from the external electronic device 102. In an example, the extracted first image data 210 may include at least one of image data regarding a past time and image data regarding a current time among the received image data, which is outputted to the first area 121 of the display 120. In an example, the processor 110 may extract the image data regarding the past time or the image data regarding the current time by a user input, while outputting the received image data through the first area 121 of the display 120. In an example, the processor 110 of the electronic device 101 may select the first image data 210 through an input on an indicator (for example, an indicator 122a of FIG. 4) for performing a rewind function, while outputting the image data received from the external electronic device 102 through the first area 121 of the display 120. The indicator 122a may be any type of interface or interactive element to enable manipulation or manipulating of the first image data 210 (e.g., time manipulation, zoom manipulation such as enlarge, or the like).

According to an embodiment, in action 307, the electronic device 101 (for example, the processor 110 of FIG. 2) may identify a first object 211 included in the first image data 210.

Figure 4:
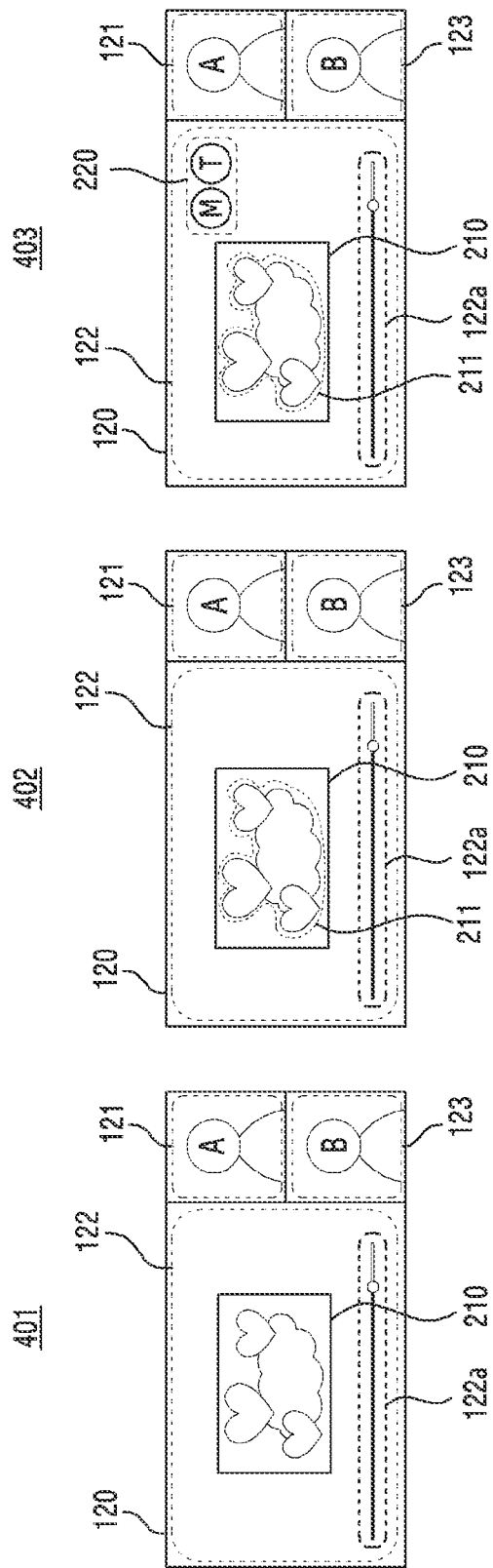
FIG. 4 is a series of views illustrating a display screen of an electronic device which provides a video call function according to an embodiment.

In an embodiment, the processor 110 may identify the first object (for example, the first object 211 of FIG. 4) in the extracted first image data (for example, the first image data 210 of FIG. 4). In an example, the processor 110 may extract the first object 211 by using various detection techniques. In an example, the first object 211 may include at least one of a person, a thing, a text, or a background image included in the first image data 210. In an example, the processor 110 may identify the first object 211 by detecting an outline of at least one object included in the first image data 210.

In an embodiment, the processor 110 may store information on the identified first object in the memory 130.

According to an embodiment, in action 309, the electronic device 101 (for example, the processor 110 of FIG. 2) may output a first user interface (for example, a first user interface 220 of FIG. 4) related to the first object, and the first image data 210 to a second area (for example, a second area 122 of FIG. 4) of the display 120. The user interfaces, described herein, may be displayed images, icons, areas, or the like that may be interactive by a user, such as through TSP 160, or other interactive element of the electronic device 101.

In an embodiment, the processor 110 may analyze the identified first object 211, and may generate the first user interface 220 related to the identified first object 211.

In an embodiment, when the identified first object 211 corresponds to text data of a first language, the processor 110 may generate the first user interface 220 for executing a translation program. In an example, the translation program may convert the text data of the first language into text data of a second language. In an example, the processor 110 may convert the text data of the first language into the text data of the second language by a first user input on the first user interface 220. In an example, the text data of the second language converted by the user input on the first user interface 220 may be outputted to the second area 122 of the display 120.

In an embodiment, when the identified first object 211 corresponds to an image of an Internet-of-Things (IoT) device which is controllable by the external electronic device 102, the processor 110 may generate the first user interface 220 for controlling the IoT device corresponding to the identified first object 211. Such IoT devices can include, for example and without limitation, home appliances, televisions, air conditioners, refrigerators, air cleaners, washing/drying machines (e.g., laundry appliances), dehumidifiers, cameras, doors, locks, cars, motorbikes, or other internet-connected devices and/or appliances.

In an embodiment, when the processor 110 generates the first user interface 220 related to the identified first object 211, the processor 110 may output the extracted first image data 210 and the first user interface 220 to the second area 122 of the display 120.

In an embodiment, the processor 110 may synthesize the first user interface 220 related to the identified first object 211, and the first image data 210, and may output the synthesized image to the second area 122 of the display 120. In an example, the processor 110 may arrange the first user interface 220 on a position where the first object 211 is identified in the first image data 210.

FIG. 4 illustrates a series of display screens of the electronic device 101 which provides a video call function according to an embodiment. Screens 401, 402, 403 represent a sequence or series of still images of a display 120 on the electronic device 101. Each of screens 401, 402, 403, may be, for example, displayed images on the display 120 of the electronic device 101, and may be interactive through the TSP 160.

Referring to a screen 401 of FIG. 4, when a video call with the external electronic device 102 is established, the processor 110 of the electronic device 101 may configure a video call screen UI on the display 120. In an example, the processor 110 may output the configured video call screen UI through the display 120. In an example, the video call screen UI may include at least one of a first area 121, a second area 122, and a third area 123 of the display 120.

In an embodiment, the processor 110 may receive at least one piece of image data from the external electronic device 102 through the communication module 140. In an example, the processor 110 may output the at least one piece of image data received from the external electronic device 102 through the first area 121 of the display 120 in real time. In an example, a user 101a of the electronic device 101 may perform a video call with a user 102a of the external electronic device 102 through the image data which is outputted to the first area 121 of the display 120 in real time.

In an embodiment, it is illustrated that the first area 121, the second area 122, and the third area 123 of the display 120 do not overlap one another, but this should not be considered as limiting. In an example, the first area 121 of the display 120 may overlap the second area 122 at least in part. Further, other overlap between the areas 121, 122, 123 may be possible without departing from the scope of the present disclosure.

In an embodiment, the processor 110 may output extracted first image data 210 through the second area 122 of the display 120. In an example, the first image data 210 may include image data regarding a past time or image data regarding a current time among the received image data which is outputted through the first area 121 of the display 120. In an example, the user of the electronic device 101 may extract the first image data 210 from the received at least one piece of image data through an input on an indicator 122a indicating a rewind function (or other time manipulation, such as a fast forward function, after a rewind function).

Referring to a screen 402 of FIG. 4, the processor 110 may identify a first object 211 included in the first image data 210.

In an example, the first object 211 may include at least one object included in the first image data 210.

Referring to a screen 403 of FIG. 4, the processor 110 may generate a first user interface 220 related to the identified first object 211.

In an embodiment, the processor 110 may output the generated first user interface 220 through the second area 122 of the display 120. In an example, the processor 110 may output the first image data 210 and the first user interface 220 through the second area 122 of the display 120. The first user interface 220 may be arranged on an area that does not overlap the first image data 210 within the second area 122 of the display 120, but this should not be considered as limiting. The first user interface 220 may be arranged on an area that overlaps, at least in part, the first image data 210.

In an embodiment, the first user interface 220 generated by the processor 110 may be determined according to a function related to the identified first object 211. For example, when the identified first object 211 corresponds to text data, the first user interface 220 connected with a translation program for performing a function for translating the text data may be generated. In another example, when the identified first object 211 corresponds to an IoT device which is controllable through the external electronic device 102 (or a network or server), the first user interface 220 connected with a program for controlling the IoT device may be generated.

In an embodiment, when the video call with the external electronic device 102 is established, the processor 110 may be configured to transmit image data to the external electronic device 102 as captured by the camera 150 of the electronic device 100. The processor 110 may identify the image data transmitted to the external electronic device 102 and display such image data (or a portion thereof) through the third area 123 of the display 120. In an example, it is illustrated that the electronic device 101 identifies image data transmitted to the external electronic device 102 through the third area 123 of the display 120, but this should not be considered as limiting. For example, when the video call with the external electronic device 102 is established and the processor 110 does not transmit image data (for example, image data resulting from photographing through the camera 150) to the external electronic device 102 and receives image data from the external electronic device 102 only in one direction, the video call screen UI may be configured to include only the first area 121 and the second area 122 of the display 120. That is, the third area 123 may be optional and may depend on the specific video call configuration between the users 101a, 102a, and/or based on the electronic devices 101, 102.

In an embodiment, when the video call with the external electronic device 102 is established, the processor 110 may operate the camera 150. In an example, the electronic device 101 may acquire image data through the camera 150. In an example, the processor 110 may transmit image data acquired through the camera 150 to the external electronic device 102 through the communication module 140. In an example, the processor 110 may output the image data acquired through the camera 150 to the third area 123 of the display 120.

In another example, when the video call with the external electronic device 102 is established, the processor 110 may output a pre-designated image to the third area 123 of the display 120.

Figure 5:
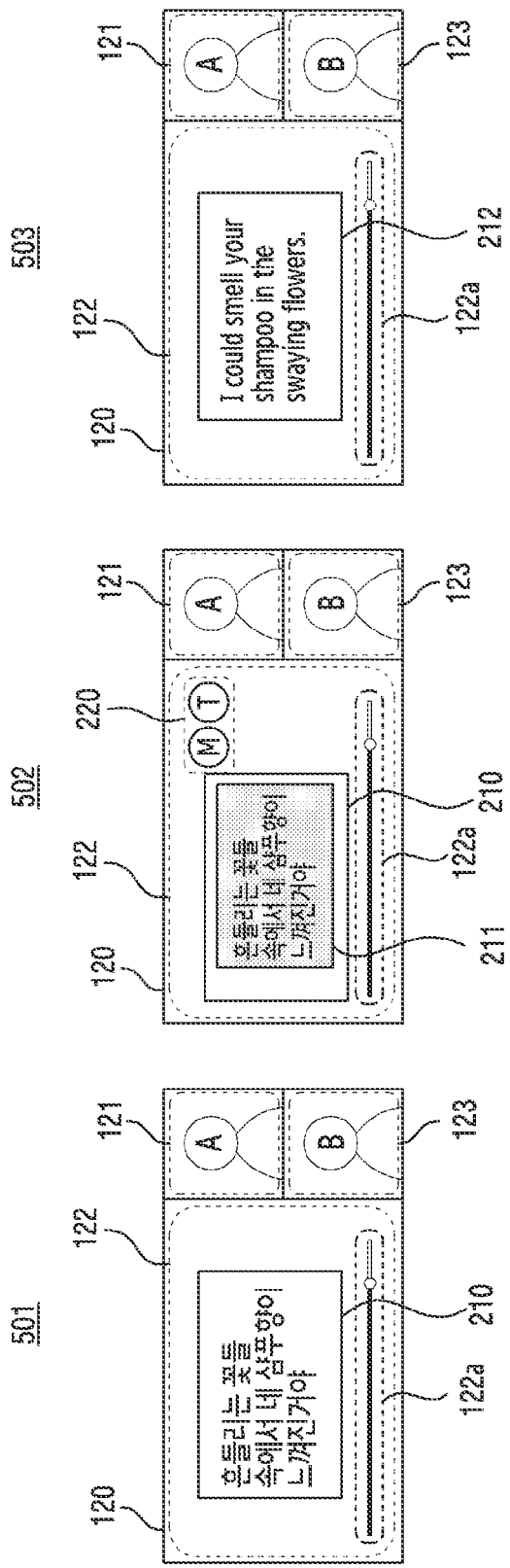
FIG. 5 is a series of views illustrating a display screen of an electronic device which provides a video call function according to another embodiment.

FIG. 5 illustrates a series of display screens 501, 502, 503 displayed on the display 120 of the electronic device 101 which provides a video call function according to another embodiment. Screens 501, 502, 503 represent a sequence or series of still images of a display 120 on the electronic device 101. Each of screens 501, 502, 503, may be, for example, displayed images on the display 120 of the electronic device 101, and may be interactive through the TSP 160.

FIG. 5 illustrates an embodiment of a case where a first object 211 identified through first image data 210 includes or is text data.

Referring to a screen 501 of FIG. 5, when a video call connection with the external electronic device 102 is established, the processor 110 may output extracted first image data 210 through the second area 122 of the display 120.

Referring to a screen 502 of FIG. 5, the processor 110 may identify the first object 211 included in the first image data 210.

In an embodiment, when the identified first object 211 includes text data of a first language, the processor 110 may generate a first user interface 220 for executing a translation program.

In an embodiment, when the identified first object 211 includes the text data of the first language, the processor 110 may generate the first user interface 220 for executing the translation program. The processor 110 may execute the translation program in response to a user input on the first user interface 220, and may convert the text data of the first language into text data of a second language.

Referring to a screen 503 of FIG. 5, when a user input on the first user interface 220 is received, the processor 110 may convert the text data of the first language included in the first object 211 into the text data of the second language, based on a translation from the translation program. In an example, the processor 110 may output the text data 212 of the second language to the second area 122 of the display 120. As illustratively shown, the output text data 212 may overlay, cover, or even replace the first object 211 and/or occupy the second area 122 of the display 120. In other embodiments, the output text data 212 (e.g., the translation) may be displayed adjacent or next to the original first object 211, and thus in some embodiments, both the first object 211 and the text data 212 may be simultaneously displayed in the second area 122 of the display 120. In still further embodiments, the first object 211 or the text data 212 may be displayed in one of the first area 121 or the third area 123, while the other of the first object 211 or the text data 212 is displayed in the second area 122.

Figure 6:
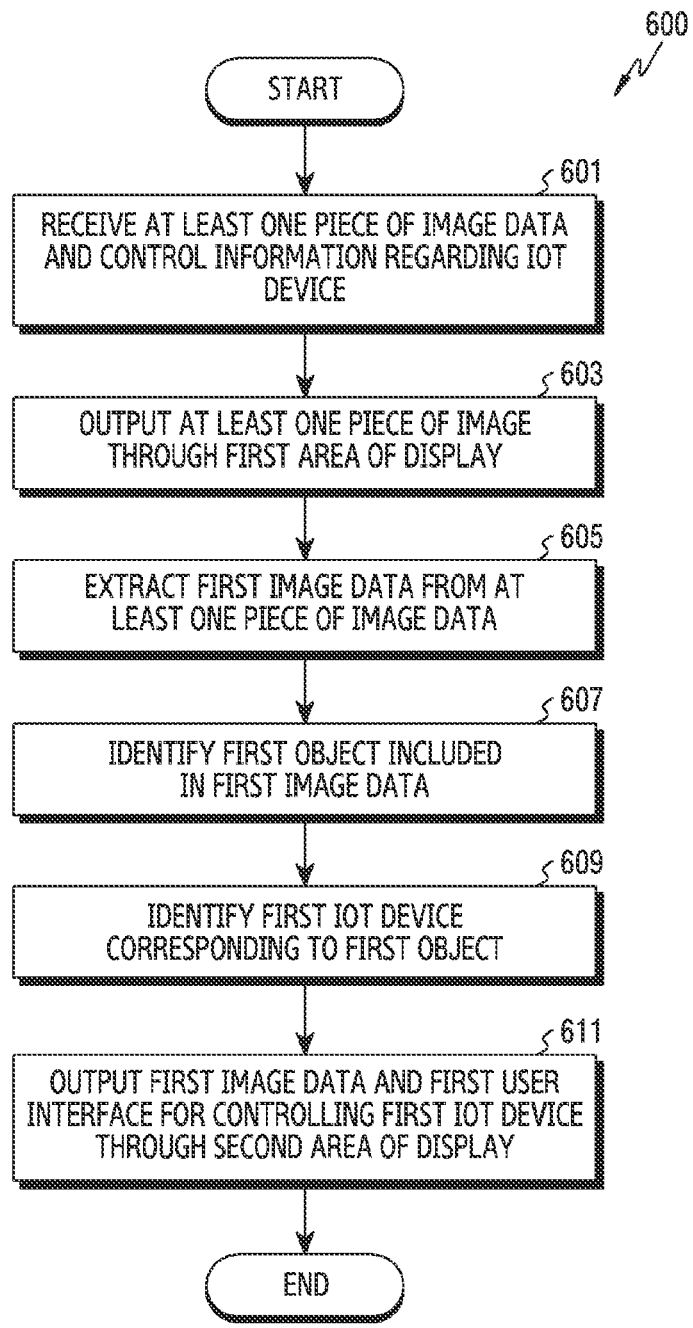
FIG. 6 is a sequence diagram provided to explain an operation of an electronic device which provides a video call function according to another embodiment.

FIG. 6 is a sequence diagram 600 provided to explain an operation of an electronic device which provides a video call function according to another embodiment.

FIG. 6 is a sequence diagram 600 provided to explain an embodiment of a case where a first object 211 identified through first image data 210 corresponds to an IoT device controllable through the external electronic device 102.

In an embodiment, the electronic device 101 may receive a video call connection. In an example, the electronic device 101 may request a video call connection from the external electronic device 102 by using the communication module 140, or may receive a request for a video call connection from the external electronic device 102.

According to an embodiment, in action 601, the electronic device 101 (for example, the processor 110 of FIG. 2) may receive, from the external electronic device 102 or other source of data, at least one piece of image data and control information regarding one or more IoT devices controllable through the external electronic device 102.

In an embodiment, the processor 110 may access a server by using a group account related to the electronic device 101 and the external electronic device 102, in order to control one or more IoT devices controllable through the external electronic device 102, and may identify access authority information of the group account by using the group account. In an example, the processor 110 may receive control information regarding the IoT devices in response to the access authority information of the group account being identified.

According to an embodiment, in action 603, the electronic device 101 (for example, the processor 110 of FIG. 2) may output the at least one piece of image data received from the external electronic device 102 through the first area 121 of the display 120.

In an embodiment, the processor 110 may output the image data received from the external electronic device 102 through the first area 121 of the display 120 in real time.

According to an embodiment, in action 605, the electronic device 101 (for example, the processor 110 of FIG. 2) may extract first image data 210 through the at least one piece of image data received from the external electronic device 102.

In an embodiment, a user of the electronic device 101 may select, through an input on an indicator (for example, an indicator 122a of FIG. 7), the first image data among the image data received through the first area 121 in real time. In an example, the first image data 210 may include image data regarding a past time or image data regarding a current time.

In an embodiment, the processor 110 may output the extracted first image data 210 to the second area 122 of the display 120.

According to an embodiment, in action 607, the electronic device 101 (for example, the processor 110 of FIG. 2) may identify a first object 211 in the first image data 210.

According to an embodiment, in action 609, the electronic device 101 (for example, the processor 110 of FIG. 2) may identify a first IoT device corresponding to the first object, based on the control information on the IoT device.

According to an embodiment, the control information on the IoT device may include at least one of image information of an IoT device and authentication information on the IoT device.

In an embodiment, the processor 110 may compare the first object 211 and the image information on the IoT device, based on the control information on the IoT device. In an example, the processor 110 may identify the first IoT device corresponding to the first object 211, based on a result of comparing the first object 211 and the image information on the IoT device.

In an embodiment, the processor 110 may execute a program for controlling the first IoT device corresponding to the first object 211, in response to the first IoT device corresponding to the first object 211 being identified. In an example, the program for controlling the first IoT device corresponding to the first object 211 may be executed based on authentication information on the IoT device.

According to an embodiment, in action 611, the electronic device 101 (for example, the processor 110 of FIG. 2) may output a first user interface 220 for controlling the first IoT device corresponding to the first object 211, and the first image data 210 through the second area 122 of the display 120.

In an embodiment, the processor 110 may synthesize the first user interface 220 and the first image data 210, and may output the synthesized image data to the second area 122 of the display 120.

Figure 7:
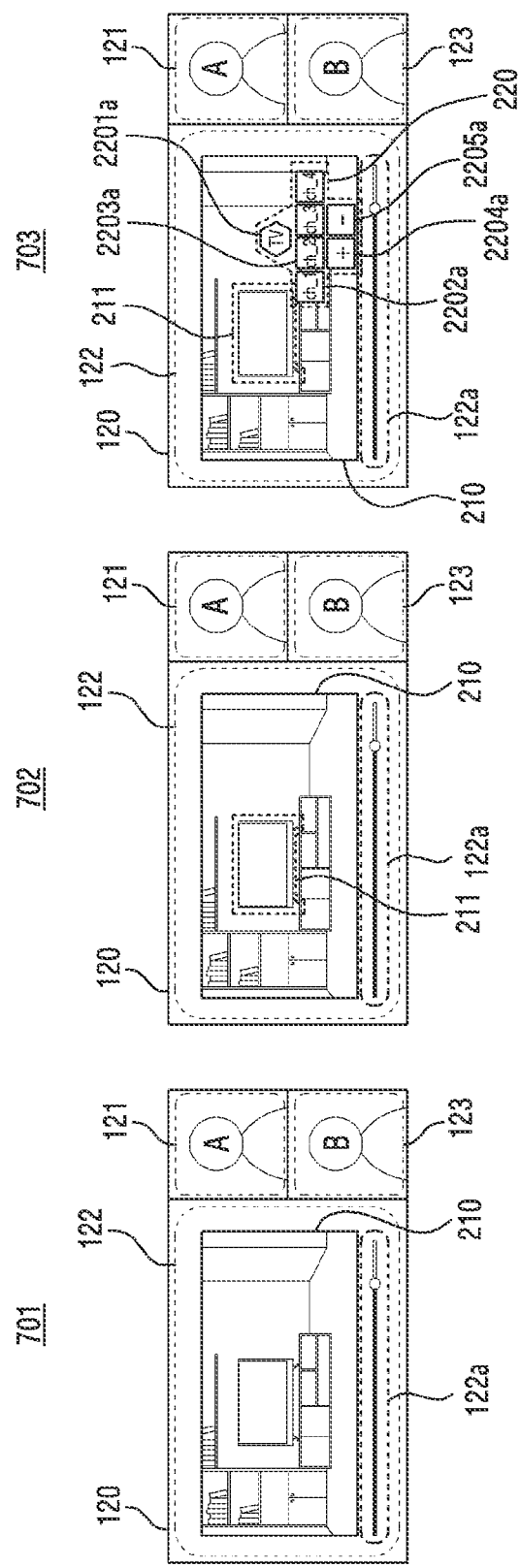
FIG. 7 is a series of views illustrating a display screen of an electronic device which provides a video call function according to another embodiment.

FIG. 7 illustrates a series of display screens 701, 702, 703 of the electronic device 101 which provides a video call function according to another embodiment. Screens 701, 702, 703 represent a sequence or series of still images of a display 120 on the electronic device 101. Each of screens 701, 702, 703, may be, for example, displayed images on the display 120 of the electronic device 101, and may be interactive through the TSP 160.

FIG. 7 illustrates an embodiment of a case where the first object 211 corresponds to an IoT device controllable through the external electronic device 102.

Referring to a screen 701 of FIG. 7, the processor 110 may output first image data 210 extracted from image data received from the external electronic device 102 to the second area 122 of the display 120. In an example, the first image data 210 may include image data indicating a surrounding environment space which is photographed or captured (e.g., live video) by a rear-facing camera of the external electronic device 102.

Referring to a screen 702 of FIG. 7, the processor 110 may identify a first object 211 in the first image data 210. In an example, the first object 211 may include an IoT device which is disposed in the surrounding environment space of the external electronic device 102. For example, the first object 211 may include an IoT device controllable through the external electronic device 102. For example, the IoT device controllable through the external electronic device 102 may include a home appliance such as a television, an air conditioner, a refrigerator, an air cleaner, a washing machine, and a dehumidifier, but is not limited thereto. For example, the IoT device may include a device like a car or motorbike.

Referring to a screen 703 of FIG. 7, the processor 110 may output a first user interface 220 for controlling a first IoT device corresponding to the first object 211 to the second area 122 of the display 120. In an example, when the first IoT device corresponding to the identified first object 211 is identified, based on control information on an IoT device that is received from the external electronic device 101, the processor 110 may output, to the second area 122 of the display 120, the first user interface 220 for controlling the first IoT device corresponding to the first object 211. In an example, the first user interface 220 may be arranged on an area that corresponds to an area where the first object 211 is disposed in the first image data 210.

In an embodiment, the processor 110 may acquire depth data on the first object 211, based on the first image data 210.

In an embodiment, the processor 110 may generate a first augmented reality image for determining a position and a direction of the first object 211. The processor 110 may transmit the first augmented reality image and the first image data 210 to the external electronic device 102 through the communication module 140. The first augmented reality image indicating the position and the direction of the first object 211, and the first image data 210 are transmitted to the external electronic device 102, such that the user of the external electronic device 102 may recognize that the first IoT device corresponding to the first object 211 is controlled through the electronic device 101. In an example, a screen outputted to the display of the external electronic device 102 when the external electronic device 102 receives the first augmented reality image and the first image data 210 from the electronic device 101 will be described with reference to FIG. 10.

In an embodiment, referring again to FIG. 7, when the first IoT device corresponding to the first object 211 is a television, the first user interface 220 for controlling the first IoT device may include an interface 2201a for indicating a type of the first IoT device corresponding to the first object 211, an interface 2202a, 2203a for controlling a first function of the IoT device (e.g., a channel displayed on the television), and an interface 2204a, 2205a for controlling one or more additional functions of the IoT device (e.g., a volume output from the television).

In an embodiment, the user of the electronic device 101 may control the first IoT device corresponding to the first object 211 through a user input on the first user interface 220. In an example, when a user input is received through the first user interface 220 (e.g., by the TSP 160), the processor 110 may transmit a control signal regarding the first IoT device that corresponds to the user input on the first user interface 220 to the external electronic device 102.

Figure 8:
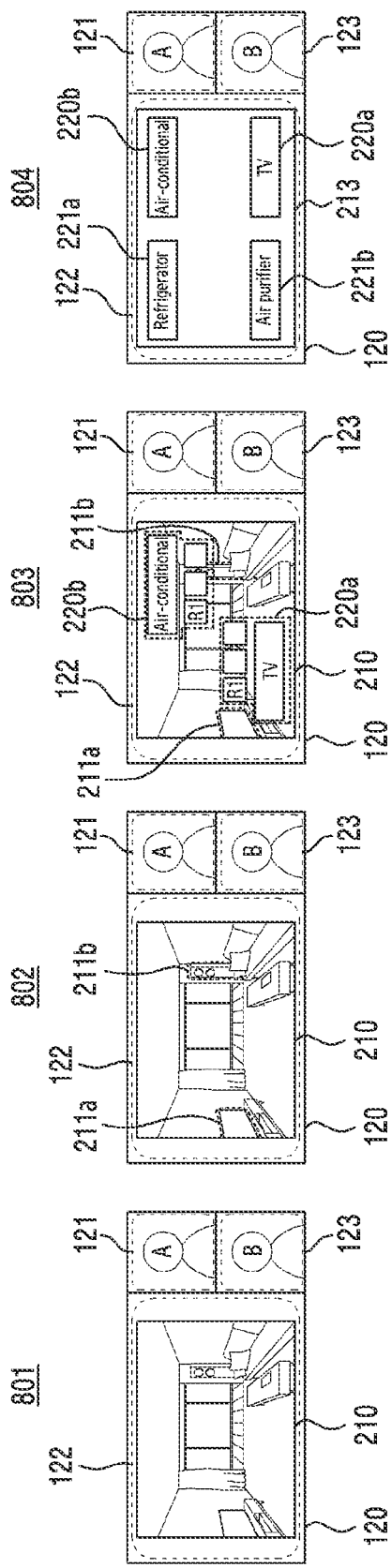
FIG. 8 is a series of views illustrating a display screen of an electronic device which provides a video call function according to another embodiment.

FIG. 8 illustrates a display screen of the electronic device 101 which provides a video call function according to another embodiment.

FIG. 8 illustrates an embodiment of a case where a first object 211 identified through first image data 210 corresponds to an IoT device controllable through the external electronic device 102. FIG. 8 illustrates a series of display screens 801, 802, 803, 804 of the electronic device 101 which provides a video call function according to another embodiment. Screens 801, 802, 803, 804 represent a sequence or series of still images of a display 120 on the electronic device 101. Each of screens 801, 802, 803, 804, may be, for example, displayed images on the display 120 of the electronic device 101, and may be interactive through the TSP 160.

Referring to a screen 801 of FIG. 8, the processor 110 may output first image data 210 extracted from image data received from the external electronic device 102 to the second area 122 of the display 120. In an example, the first image data 210 may include image data indicating a surrounding environment space which is photographed by a camera (e.g., rear-facing camera) of the external electronic device 102.

Referring to a screen 802 of FIG. 8, the processor 110 may identify a first object 211a and a second object 211b in the first image data 210. In an example, the first object 211a and the second object 211b may include IoT devices disposed or located in a surrounding space of the external electronic device 102. For example, the first object 211a may include a display device controllable through the external electronic device 102. The second object 211b may include an air conditioner controllable through the external electronic device 102.

Referring to a screen 803 of FIG. 8, the processor 110 may output, to the second area 122 of the display 120, a first user interface 220a for controlling a first IoT device corresponding to the first object 211a on the first image data 210. The processor 110 may output, to the second area 122 of the display 120, a first user interface 220b for controlling a second IoT device corresponding to the second object 211b on the first image data 210.

In an example, the processor 110 may output the first user interface 220a to an area corresponding to the first object 211a in the first image data 210. The processor 110 may output the first user interface 220b on an area corresponding to the second object 211b in the first image data 210.

Referring to a screen 804 of FIG. 8, the processor 110 may output, through the second area 122 of the display 120, a virtual space 213 indicating a position relationship among the first IoT device corresponding to the first object 211a, a second IoT device corresponding to the second object 211b, and one or more additional IoT devices that are not included in the first image data 210. Such additional IoT devices may be associated with the surrounding environment of the external electronic device 102, and may be other IoT devices of a room or building that are not displayed in the first image data 210.

In an embodiment, the processor 110 may generate the virtual space 213 indicating the surrounding environment of the external electronic device 102, based on control information regarding IoT devices. The processor 110 may identify the first IoT device corresponding to the first object 211 identified through the first image data 210, and the third IoT device that is not included in the first image data 210 and is disposed in the surrounding space of the external electronic device 102.

In an embodiment, the processor 110 may output, to the second area 122 of the display 120 and in the virtual space 213, the first user interface 220a, 220b for controlling the first IoT device corresponding to the first object 211a identified through the first image data 210, and the second IoT device corresponding to the second object 211b, respectively. The processor 110 may output, to the second area 122 of the display 120 and in the virtual space 213, one or more second user interface 221a, 221b for controlling the additional IoT device(s) that is not included in the first image data 210.

In an embodiment, the processor 110 may arrange the first user interface 220a, 220b and the second user interface 221a, 221b in the virtual space 213 indicating the surrounding space of the external electronic device 102, and may output through the second area 122 of the display 120. In an example, the processor 110 may arrange the first user interface 220a, 220b and the second user interface 221a, 221b, by reflecting the position relationship among the first IoT device corresponding to the first object 211a, the second IoT device corresponding to the second object 211b, and the additional IoT device(s) that is not included in the first image data 210 and is disposed or located in the surrounding space (e.g., room, building, etc.) of the external electronic device 102.

Figure 9:
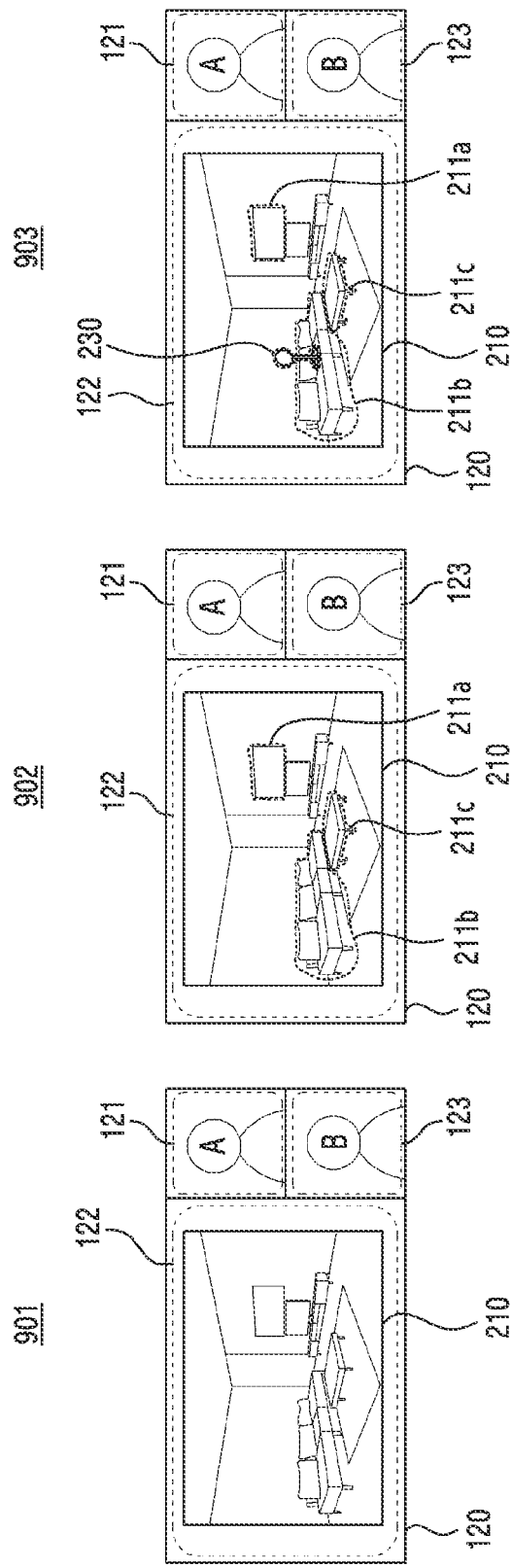
FIG. 9 is a series of views illustrating a display screen of an electronic device which provides a video call function according to another embodiment.

FIG. 9 illustrates a display screen of the electronic device 101 which provides a video call function according to another embodiment. FIG. 9 illustrates a series of display screens 901, 902, 903 of the electronic device 101 which provides a video call function according to another embodiment. Screens 901, 902, 903 represent a sequence or series of still images of a display 120 on the electronic device 101. Each of screens 901, 902, 903 may be, for example, displayed images on the display 120 of the electronic device 101, and may be interactive through the TSP 160. Referring to a screen 901 of FIG. 9, the processor 110 may output first image data 210 extracted from image data received from the external electronic device 102 to the second area 122 of the display 120. In an example, the first image data 210 may include image data indicating a surrounding environment space photographed and/or video captured by the rear-facing camera of the external electronic device 102.

Referring to a screen 902 of FIG. 9, the processor 110 may identify a first object 211a, a second object 211b, and a third object 211c through the first image data 210.

In an embodiment, the processor 110 may receive a signal regarding selection of at least one of the first object 211a, the second object 211b, and the third object 211c identified through the first image data 210. In an example, a user of the electronic device 101 may select any one object from the first object 211a, the second object 211b, and the third object 211c through a user input on the electronic device 101 (e.g., through interaction with TSP 160).

In an embodiment, the processor 110 may generate an augmented reality image for determining a position and a direction of an object selected from the first object 211a, the second object 211b, and the third object 211c. The processor 110 may transmit the generated augmented reality image (for example, an indicator 260 of FIG. 10) to the external electronic device 102.

Referring to a screen 903 of FIG. 9, the processor 110 may output a first user interface 230 related to the object selected from the first object 211a, the second object 211b, and the third object 211c through the second area 122 of the display 120.

In an embodiment, the processor 110 may output, to the second area 122 of the display 120, the first user interface 230 for indicating position information regarding at least one object selected from the first object 211a, the second object 211b, and the third object 211c. For example, when the second object 211b is selected from the first object 211a, the second object 211b, and the third object 211c identified through the first image data by a user input, the processor 110 may arrange the first user interface 230 to overlap an area where the second object 211b is positioned in the first image data 210.

In an embodiment, the processor 110 may transmit the first user interface 230 for indicating position information regarding the at least one object selected from the first object 211a, the second object 211b, and the third object 211c, and the first image data 210 to the external electronic device 102.

Figure 10:
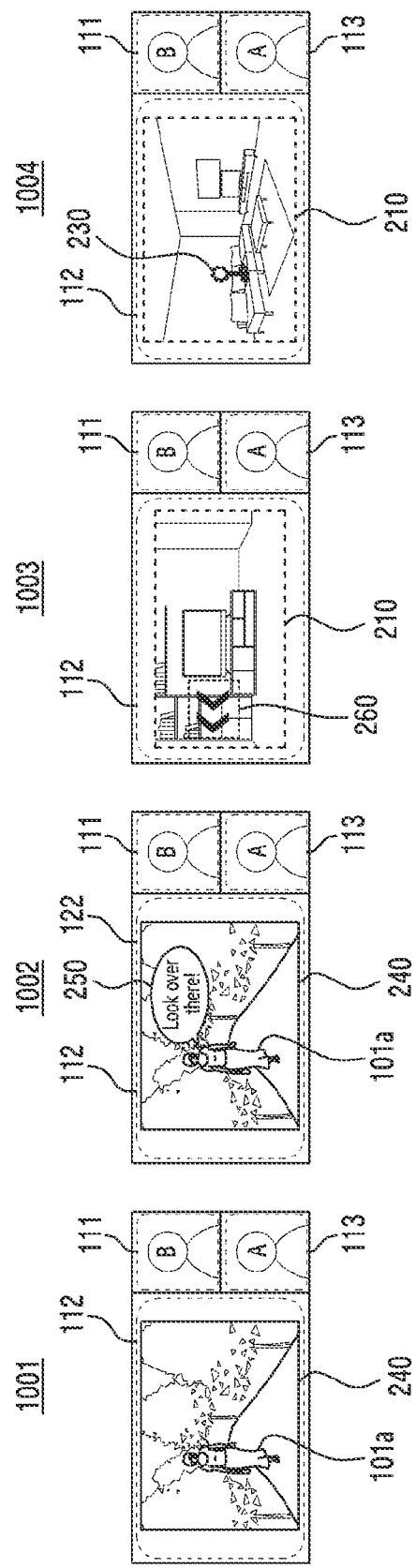
FIG. 10 is a series of views illustrating a display screen of an external electronic device which provides a video call function according to another embodiment.

FIG. 10 illustrates a display screen of the external electronic device 102 which provides a video call function according to another embodiment. FIG. 10 illustrates a series of display screens 1001, 1002, 1003, 1004 of the external electronic device 102 which provides a video call function according to another embodiment. Screens 1001, 1002, 1003, 1004 represent a sequence or series of still images of a display of the external electronic device 102. Each of screens 1001, 1002, 1003, 1004 may be, for example, displayed images on the display of the external electronic device 102 and may be interactive through a TSP of the external electronic device 102.

FIG. 10 illustrates a display screen of the external electronic device 102 which receives the augmented reality image, the first image data 210, and the first user interface 230 from the electronic device 101 of FIG. 9.

Referring to a screen 1001 of FIG. 10, the external electronic device 102 may output image data 240 received from the electronic device 101 on a display screen of the external electronic device 102. In an example, the image data 240 received from the electronic device 101 may include subject information regarding a user 101a of the electronic device 101. As shown, the display of the external electronic device may include a first area 111, a second area 112, and a third area 113, similar to the first area 121, the second area 122, and the third area 123 of the electronic device 101. As such, similar features and aspects thereof will not be described in detail.

Referring to a screen 1002 of FIG. 10, when the processor 110 of the electronic device 101 receives a user input on any one of the first object 211a, the second object 211b, and the third object 211c, and generates an augmented reality image regarding this, the processor 110 may transmit a signal indicating generation of the augmented reality image to the external electronic device 102. When the external electronic device 102 receives the signal indicating generation of the augmented reality image from the electronic device 101, an indicator 250 may be outputted to the screen of the external electronic device 102 within the image data 240 and/or in the second area 112.

Referring to a screen 1003 of FIG. 10, the external electronic device 102 may output image data resulting from photographing or capturing live images through the camera of the external electronic device 102 to the screen of the external electronic device 102, in response to the indicator 250 being outputted to the screen of the external electronic device 102. In an example, the external electronic device 102 may output an indicator 260 indicating the augmented reality image for determining a position and a direction of an object selected from the first object 211a, the second object 211b, and the third object 211c in the image data which results from photographing through the camera of the external electronic device 102.

In an embodiment, the external electronic device 102 may receive a user input of the external electronic device 102 on the indicator 260 for identifying the object selected by the user of the electronic device 101.

Referring to a screen 1004 of FIG. 10, when the external electronic device 102 receives a user input of the external electronic device 102 on the indicator 260, the external electronic device 102 may output the first image data 210 received through the electronic device 101, and the first user interface 230 through the display. In an example, the user of the external electronic device 102 may identify the object selected by the user of the electronic device 101, and the first user interface 230 related to the selected object through the display.

Figure 11:
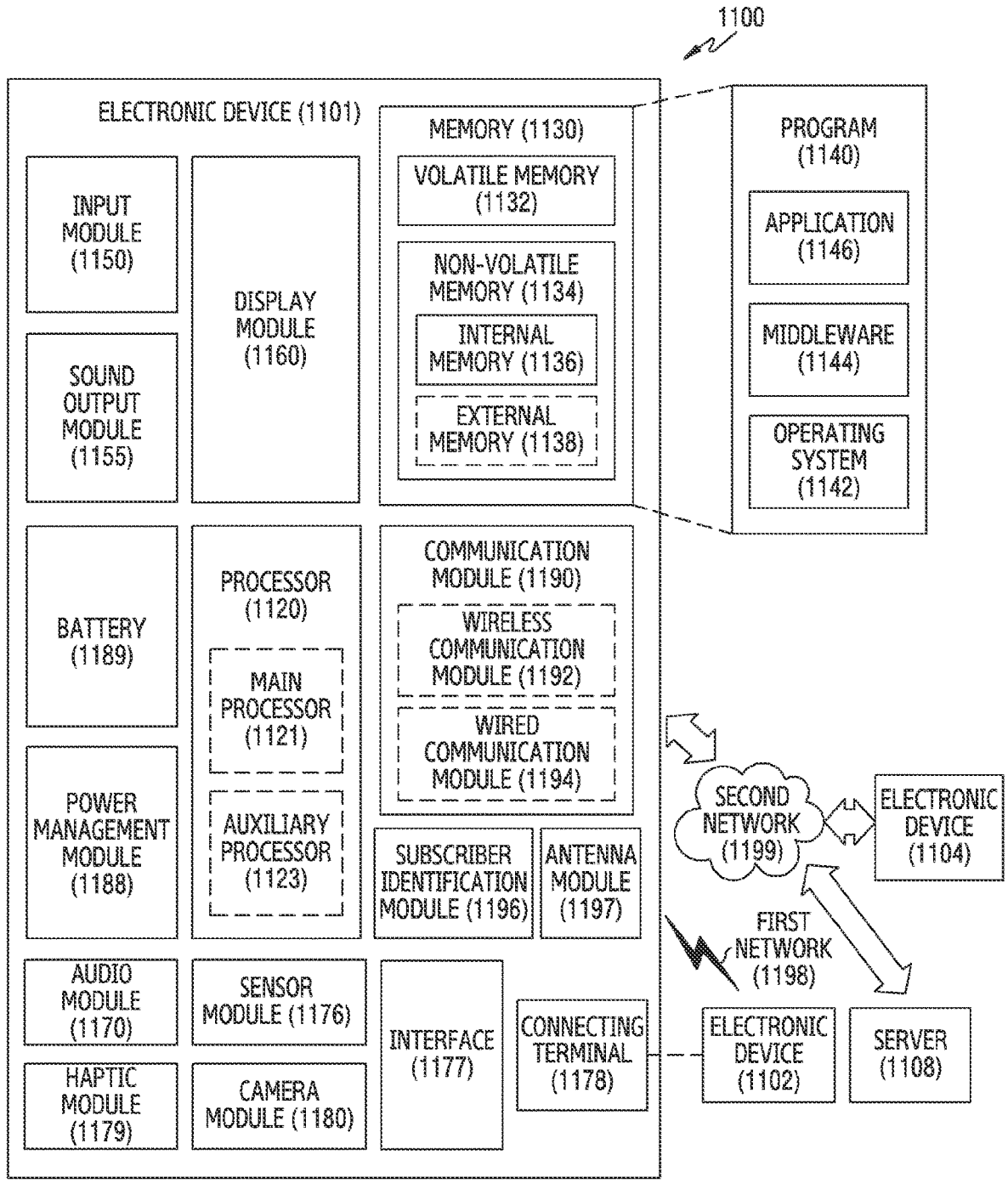
FIG. 11 is a block diagram of an electronic device in a network environment according to various embodiments.

FIG. 11 is a block diagram illustrating an electronic device 1101 in a network environment 1100 according to various embodiments. Referring to FIG. 11, the electronic device 1101 in the network environment 1100 may communicate with an electronic device 1102 via a first network 1198 (e.g., a short-range wireless communication network), or at least one of an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. In some embodiments, at least one of the components (e.g., the connecting terminal 1178) may be omitted from the electronic device 1101, or one or more other components may be added in the electronic device 1101. In some embodiments, some of the components (e.g., the sensor module 1176, the camera module 1180, or the antenna module 1197) may be implemented as a single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123. According to an embodiment, the auxiliary processor 1123 (e.g., the neural processing unit) may include a hardware structure specified for artificial intelligence model processing. An artificial intelligence model may be generated by machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by another component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor adapted to detect a touch, or a pressure sensor adapted to measure the intensity of force incurred by the touch.

The audio module 1170 may convert a sound into an electrical signal and vice versa. According to an embodiment, the audio module 1170 may obtain the sound via the input module 1150, or output the sound via the sound output module 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192

(e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the mmWave band) to achieve, e.g., a high data transmission rate. The wireless communication module 1192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., a printed circuit board (PCB)). According to an embodiment, the antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

According to various embodiments, the antenna module 1197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 or 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultra low-latency services using, e.g., distributed computing or mobile edge computing. In another embodiment, the external electronic device 1104 may include an internet-of-things (IoT) device. The server 1108 may be an intelligent server using machine learning and/or a neural network. According to an embodiment, the external electronic device 1104 or the server 1108 may be included in the second network 1199. The electronic device 1101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, an electronic device may include a display, a memory, a communication module configured to perform a video call with an external electronic device, and a processor electrically connected with the display, the memory, and the communication module, and the processor may receive at least one piece of image data from the external electronic device through the communication module, may output the received at least one piece of image data to a first area of the display, may extract first image data among the at least one piece of image data in response to a first user input, may identify a first object included in the extracted first image data, and may output a first user interface related to the identified first object, and the first image data to a second area of the display which is distinguished from the first area.

According to an embodiment, the first user interface related to the first object may include an augmented reality image for determining a position and a direction of the first object.

According to an embodiment, the memory may store a translation program, and, when the first object includes text data of a first language, the first user interface may include a user interface for translating the text data of the first language into text data of a second language.

According to an embodiment, in response to a second user input on the first user interface, the processor may translate the text data of the first language into the text data of the second language, and may output the text data of the second language to the second area of the display.

According to an embodiment, the processor may receive control information regarding an IoT device controllable through the external electronic device, and the at least one piece of image data through the external electronic device, may identify a first IoT device corresponding to the first object, based on the control information regarding the IoT device, and may output the first user interface for controlling the first IoT device to the second area of the display.

According to an embodiment, the control information regarding the IoT device may include image information of the IoT device, and the processor may compare the first object and the image information of the IoT device, and may identify the first IoT device corresponding to the first object, based on a result of comparing.

According to an embodiment, the processor may arrange the first user interface on an area overlapping an area where the first object is arranged in the first image data.

According to an embodiment, the processor may transmit a control signal regarding the first IoT device that corresponds to a second user input to the external electronic device, in response to the second user input on the first user interface.

According to an embodiment, the processor may generate a first augmented reality image for determining a position and a direction of the first object, and may transmit the first image data and the first augmented reality image to the external electronic device through the communication module.

According to an embodiment, the processor may access a server by using a group account related to the electronic device and the external electronic device in order to control the IoT device, and may identify access authority information of the group account by using the group account, and, in response to the access authority information of the group account being identified, the processor may receive the control information regarding the IoT device.

According to an embodiment, the processor may identify a second IoT device except for the first IoT device corresponding to the first object, based on the control information regarding the IoT device, and may output a second user interface for controlling the second IoT device to the second area of the display.

According to an embodiment, the processor may generate a virtual space indicating a surrounding environment of the external electronic device, based on the first image data and the control information regarding the IoT device, may arrange the first user interface and the second user interface indicating a position relationship among the external electronic device, the first IoT device, and the second IoT device in the virtual space, and may output the first user interface and the second user interface which are arranged in the virtual space to the second area of the display.

According to an embodiment, the processor may store the at least one piece of image data received from the external electronic device in the memory.

According to various embodiments, an operating method of an electronic device may include: receiving at least one piece of image data from an external electronic device through a communication module; outputting the received at least one piece of image data to a first area of a display; extracting first image data among the at least one piece of image data in response to a first user input; identifying a first object included in the extracted first image data; and outputting a first user interface related to the identified first object, and the first image data to a second area of the display which is distinguished from the first area.

According to an embodiment, the method may include: when the first object includes text data of a first language, translating the text data of the first language into text data of a second language in response to a second user input on the first user interface; and outputting the text data of the second language to the second area of the display.

According to an embodiment, the method may include: receiving control information regarding an IoT device and the at least one piece of image data through the external electronic device; identifying a first IoT device corresponding to the first object, based on the control information regarding the IoT device; and outputting the first user interface for controlling the first IoT device to the second area of the display.

According to an embodiment, the control information regarding the IoT device may include at least one of image information of the IoT device and authentication information of the IoT device, and the method may include: comparing the first object and the image information of the IoT device; and identifying the first IoT device corresponding to the first object, based on a result of the comparing.

According to an embodiment, the method may include: receiving a second user input on the first user interface; and, in response to the second user input being received, transmitting a control signal regarding the first IoT device that corresponds to the second user input to the external electronic device.

According to an embodiment, the method may include: accessing a server by using a group account related to the electronic device and the external electronic device in order to control an IoT device, identifying access authority information of the group account, and, in response to the access authority information of the group account being identified, receiving the control information regarding the IoT device.

According to an embodiment, the method may include arranging the first user interface on an area overlapping an area where the first object is arranged in the first image data.

What is claimed:
1. An electronic device comprising:
a display;
a communication module configured to perform a video call with an external electronic device; and
at least one processor; and
memory storing instructions that, when executed by the at least one processor, cause the electronic device to:
receive, through the communication module, at least one piece of image data and control information regarding one or more internet-of-thing (IoT) devices controllable through the external electronic device, from the external electronic device;
output the received at least one piece of image data to a first area of the display;
extract first image data among the at least one piece of image data in response to a first user input;
identify a first object included in the extracted first image data;
identify a first IoT device of the one or more IoT devices corresponding to the first object, based on the control information regarding the one or more IoT devices; and
output a first user interface related to the identified first object, and the first image data to a second area of the display which is distinguished from the first area, the first user interface comprising controls for controlling the first IoT device.

2. The electronic device of claim 1, wherein the first user interface related to the first object comprises an augmented reality image.

3. The electronic device of claim 1, wherein the memory is configured to store a translation program, and
wherein, when the first object comprises text data of a first language, the first user interface comprises a user interface for translating the text data of the first language into text data of a second language.

4. The electronic device of claim 3, wherein the instructions, when executed by the at least one processor, cause the electronic device to:

in response to a second user input on the first user interface, translate the text data of the first language into the text data of the second language; and output the text data of the second language to the second area of the display.

5. The electronic device of claim 1, wherein the control information regarding the one or more IoT devices comprises image information of the one or more IoT devices, and wherein the instructions, when executed by the at least one processor, cause the electronic device to:

compare the first object with the image information of the one or more IoT devices; and identify the first IoT device corresponding to the first object from the one or more IoT devices, based on a result of the comparison.

6. The electronic device of claim 1, wherein the instructions, when executed by the at least one processor, cause the electronic device to arrange the first user interface on an area overlapping an area where the first object is arranged in the first image data.

7. The electronic device of claim 1, wherein the instructions, when executed by the at least one processor, cause the electronic device to transmit a control signal regarding the first IoT device that corresponds to a second user input to the external electronic device, in response to the second user input on the first user interface.

8. The electronic device of claim 1, wherein the instructions, when executed by the at least one processor, cause the electronic device to:

generate a first augmented reality image; and transmit the first image data and the first augmented reality image to the external electronic device through the communication module.

9. The electronic device of claim 1, wherein the instructions, when executed by the at least one processor, cause the electronic device to:

access a server by using a group account related to the electronic device and the external electronic device in order to control the IoT device, identify access authority information of the group account by using the group account; and in response to the access authority information of the group account being identified, receive the control information regarding the IoT device.

10. The electronic device of claim 1, wherein the instructions, when executed by the at least one processor, cause the electronic device to:

identify a second IoT device different from the first IoT device corresponding to the first object, based on the control information regarding the one or more IoT devices; and output a second user interface for controlling the second IoT device to the second area of the display.

11. The electronic device of claim 10, wherein the instructions, when executed by the at least one processor, cause the electronic device to:

generate a virtual space indicating a surrounding environment of the external electronic device, based on the first image data and the control information regarding the one or more IoT devices;

arrange the first user interface and the second user interface indicating a position relationship between the first IoT device and the second IoT device in the virtual space; and output the first user interface and the second user interface which are arranged in the virtual space to the second area of the display.

12. The electronic device of claim 1, wherein the instructions, when executed by the at least one processor, cause the electronic device to store the at least one piece of image data received from the external electronic device in the memory.

13. An operating method of an electronic device, the method comprising:

receiving, through a communication module of the electronic device, at least one piece of image data and control information regarding one or more internet-of-thing (IoT) devices controllable through the external electronic device, from an external electronic device different from the electronic device;

outputting the received at least one piece of image data to a first area of a display of the electronic device;

extracting first image data among the at least one piece of image data in response to a first user input;

identifying a first object included in the extracted first image data;

identifying a first IoT device corresponding to the first object, based on the control information regarding the one or more IoT devices; and outputting a first user interface related to the identified first object, and the first image data to a second area of the display which is distinguished from the first area, the first user interface comprising controls for controlling the first IoT device.

14. The method of claim 13, comprising:

when the first object comprises text data of a first language, translating the text data of the first language into text data of a second language in response to a second user input on the first user interface; and outputting the text data of the second language to the second area of the display.

15. The method of claim 13, wherein the control information regarding the one or more IoT devices comprises at least one of image information of the one or more IoT devices and authentication information of the one or more IoT devices, and wherein the method comprises:

comparing the first object and the image information of the one or more IoT devices; and identifying the first IoT device corresponding to the first object from the one or more IoT device, based on a result of the comparing.

16. The method of claim 13, comprising:

receiving a second user input on the first user interface; and in response to the second user input, transmitting to the external electronic device a control signal regarding the first IoT device that corresponds to the second user input.

17. The method of claim 13, comprising:

accessing a server by using a group account related to the electronic device and the external electronic device in order to control an Internet-of-Things (IoT) device;

identifying access authority information of the group account; and in response to the access authority information of the group account being identified, receiving the control information regarding the IoT device.

18. The method of claim 13, comprising arranging the first user interface on an area overlapping an area where the first object is arranged in the first image data.

* * * * *